US011845042B1

(12) United States Patent
Schnefke et al.

(10) Patent No.: US 11,845,042 B1
(45) Date of Patent: Dec. 19, 2023

(54) AUTOMATED TANK MIXING

(71) Applicant: PHILLIPS 66 COMPANY, Houston, TX (US)

(72) Inventors: Luke Schnefke, Houston, TX (US); Victor Cedillo, Cypress, TX (US); Patrick David, Houston, TX (US); Matt Clowe, Cypress, TX (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 18/191,511

(22) Filed: Mar. 28, 2023

(51) Int. Cl.
*B01F 35/21* (2022.01)
*B01F 35/22* (2022.01)
(Continued)

(52) U.S. Cl.
CPC .......... *B01F 35/2209* (2022.01); *B01F 23/41* (2022.01); *B01F 35/2134* (2022.01);
(Continued)

(58) Field of Classification Search
None
See application file for complete search history.

(56) References Cited

U.S. PATENT DOCUMENTS

| | | | | |
|---|---|---|---|---|
| 4,315,421 A | * | 2/1982 | Wilson | G05D 21/02 72/236 |
| 4,767,476 A | * | 8/1988 | Gebauer | B01F 23/41 422/163 |

(Continued)

FOREIGN PATENT DOCUMENTS

| | | |
|---|---|---|
| WO | 2016201297 | 12/2016 |
| WO | 2017173165 | 10/2017 |

OTHER PUBLICATIONS

Michael J. Cordon, Junyan Zhang, Stephen C. Purdy, Evan C. Wegener, Kinga A. Unocic, Lawrence F. Allard, Mingxia Zhou, Rajeev S. Assary, Jeffrey T. Miller, Theodore R. Krause, Fan Lin, Huamin Wang, A. Jeremy Kropf, Ce Yang, Dongxia Liu, and Zhenglong Li, "Selective Butene Formation in Direct Ethanol-to-C3+-Olefin Valorization over Zn-Y/Beta and Single-Atom Alloy Composite Catalysts Using in Situ-Generated Hydrogen", ACS Catalysis 2021, vol. 11, pp. 7193-7209.

(Continued)

*Primary Examiner* — Brian R Gordon
(74) *Attorney, Agent, or Firm* — Phillips 66 Company

(57) ABSTRACT

A method is taught for maintaining a fluid within a tank. In this method an upper data acquisition device is operated which is capable of obtaining at least one characteristic of the fluid in a tank adjacent to the upper data acquisition device. A lower data acquisition device is also operated which is situated below the upper data acquisition device, capable of obtaining at least one characteristic of the fluid in the tank adjacent to the lower data acquisition device. A data analyzer is then utilized which is capable transmitting a data packet to the intermittent mixer. The method then automatically turns on the intermittent mixer from the data received from the data packet. Afterwards, the method automatically turns off the intermittent mixer from the data received from the data packet resulting in the at least one characteristic from the upper data acquisition device is within specifications of the at least one characteristic from the lower data acquisition device. In this method the intermittent mixer is capable of altering the fluid within the tank so that the at least one characteristic is consistent throughout the tank.

11 Claims, 2 Drawing Sheets

(51) Int. Cl.
*B01F 23/41* (2022.01)
*G05D 27/02* (2006.01)
*C10G 7/00* (2006.01)
*G05B 19/416* (2006.01)
*C10G 71/00* (2006.01)

(52) U.S. Cl.
CPC ............ *C10G 71/00* (2013.01); *G05B 19/416* (2013.01); *G05D 27/02* (2013.01); *G05B 2219/37371* (2013.01)

(56) References Cited

U.S. PATENT DOCUMENTS

| | | | | |
|---|---|---|---|---|
| 5,299,453 | A * | 4/1994 | Sprunt | G01N 15/0893 73/152.23 |
| 5,403,088 | A * | 4/1995 | Killmer | B01F 23/23341 366/136 |
| 5,573,333 | A * | 11/1996 | Dahlman | B01F 35/2112 366/132 |
| 6,311,847 | B1 * | 11/2001 | Soldwish-Zoole | B03B 5/60 222/64 |
| 7,479,215 | B2 * | 1/2009 | Carson | A62D 3/115 205/742 |
| 7,994,377 | B2 | 8/2011 | Coupard et al. | |
| 8,882,336 | B1 * | 11/2014 | Wolford | B01F 35/712 366/35 |
| 10,889,769 | B2 | 1/2021 | Cao et al. | |
| 11,053,181 | B2 | 7/2021 | Li | |
| 11,585,282 | B1 * | 2/2023 | Swann | F02C 9/40 |
| 11,752,476 | B1 * | 9/2023 | Schnefke | B01F 35/222 366/142 |
| 2013/0101982 | A1 * | 4/2013 | Goodwin | B01F 35/513 435/325 |
| 2014/0140164 | A1 * | 5/2014 | Greer | B01F 35/2209 366/142 |
| 2014/0142835 | A1 * | 5/2014 | Kim | B60K 35/00 701/123 |
| 2014/0269144 | A1 * | 9/2014 | Ayo | B01F 35/2134 366/8 |
| 2017/0333858 | A1 * | 11/2017 | Sen | B01F 35/2203 |
| 2018/0201554 | A1 | 7/2018 | Greene et al. | |
| 2019/0085279 | A1 * | 3/2019 | Leo | A23L 2/56 |
| 2019/0121374 | A1 * | 4/2019 | Choubak | B01F 35/2134 |
| 2019/0264517 | A1 * | 8/2019 | Chong | B01F 35/7176 |
| 2019/0358386 | A1 * | 11/2019 | Eyrard | B01F 23/53 |
| 2020/0070112 | A1 * | 3/2020 | Darmstaedter | B01F 33/84 |
| 2021/0197143 | A1 * | 7/2021 | Miller | B01F 23/49 |
| 2022/0178731 | A1 * | 6/2022 | Bivolarsky | G01F 1/667 |
| 2022/0234010 | A1 * | 7/2022 | Abughaban | B01F 35/2136 |
| 2022/0243543 | A1 * | 8/2022 | Abughaban | B01F 35/2136 |
| 2022/0266209 | A1 * | 8/2022 | Faust | B01F 35/2217 |
| 2023/0077045 | A1 * | 3/2023 | Liu | B01F 23/4105 |

OTHER PUBLICATIONS

Johnny Saavedra, Robert Dagle, Vanessa Dagle, Colin Smith, Karl Albrecht, "Oligomerization of Ethanol-Derived Propene and Isobutene Mixtures to Transportation Fuels: Catalysts and Process Considerations", Catalysis Science & Technology, 2019, 42 pages.

Zhenglong Li, Doe Bioenergy Technologies Office (BETO) 2021 Project Peer Review "Upgrading of C2 Intermediates—ORNL" Catalytic Upgrading, Oak Ridge National Laboratory, US Department of Energy, 2021, 29 pages.

Jaturapat Kittikarnchanaporn, Thirasak Pairojpiriyakul, Teerachate Boonphayoong, Sirirat Jitkamka, "Distillate Range of Hydrocarbon Production from Bio-Ehtanol Dehydration using HY, Hbeta, and HZSM-5 as supports of phosphorus Oxide" CEt Chemical Engineering Transactions, vol. 39, 2014, 6 pages.

Karthikeyan K. Ramasamy, He Zhang, Junming Sun, Yong Wang, "Conversion of ethanol to hydrocarbons on hierarchical HZSM-5 zeolites", vol. 238, 2014, pp. 103-110.

Kristo Van der Borght, Rakesh Batchu, Vladimir V. Galvita, Konstantinos Alexopoulos, Marie-Francoise Reyniers, Joris W. Thybaut, and Guy B. Marin, "Insights into the Reaction Mechanism of Ethanol Conversion into Hydrocarbons on H-ZSM-5", Angewandte Chemie International Edition, 2016, vol. 55, pp. 12817-12821.

Abhishek Dutta Chowdhury, Alessandra Lucini Paioni, Gareth T. Whiting, Donglong Fu, Marc Baldus, and Bert M. Weckhuysen, "Unraveling the Homologation Reaction Sequence of the Zeolite-Catalyzed Ethanol-to-Hydrocarbons Process", Angewandte Chemie, 2019, vol. 131, pp. 3948-3952.

Sanggil Moon, Ho-Jeong Chae, Min Bum Park, "Oligomerization of Light Olefins Over ZSM-5 and Beta Zeolite Catalysts by Modifying Textural Properties", Applied Catalysis A, General, vol. 553, 2018, pp. 15-23.

Mark V. Tsodikov, Vadim Yu.Murzin, Andrey V. Chistyakov, Fatima A. Yandieva, Mikhail A. Gubanov, Polina A. Zharova, Sergey S. Shapovalov, Olga G. Tikhonova, Alexandr A. Pasynskii, Sebastien Paul, Franck Dumeignil, "The Direct Ethanol Conversion to Hydrocarbons over Pt-Containing Catalysts", CEt Chemical Engineering Transactions, vol. 37, 2014, pp. 583-588.

\* cited by examiner

AUTOMATED TANK MIXING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Invention: A method of maintaining a fluid.

Industrial facilities, such as refineries and midstream assets, utilize highly complex machines, devices and systems and highly complex workflows, in which operators must account for a host of parameters, metrics, and the like in order to optimize design, development, deployment, and operation of different technologies in order to improve overall results. For example, within tanks, data of the fluid has historically been collected by human beings using dedicated data collectors, often recording batches of specific sensor data on media, such as tape or a hard drive, for later analysis. Batches of data have historically been returned to a central office for analysis, such as undertaking signal processing or other analysis on the data collected by various sensors, after which analysis can be used as a basis for diagnosing problems in an environment and/or suggesting ways to improve operations. This work has historically taken place on a time scale of weeks or months and has been directed to limited data sets.

In an oil and gas facilities, crude oil and product storage tanks are very important factors in smooth and continuous production. Crudes are generally received in large storage tanks from ships via pipelines for further processing. The storage tanks are often equipped with mixers, primarily to avoid settling/layering of sludge inside the tank. These mixers are operated to obtain a homogeneous blend of different crudes with respect to basic sediment and water and density of the crudes. A homogeneous crude blend is desirable for consistent operation of downstream units. The crude blend's homogeneity is determined based on the density variation between different samples of crude, for example three samples of crude taken from the top, middle and bottom of the tank. This results in a multitude of data that needs to be analyzed.

The emergence of the Internet of Things (IoT) has made it possible to connect continuously to, and among, a much wider range of devices. Within refineries the range of available data is often limited, and the complexity of dealing with data from multiple sensors makes it much more difficult to produce "smart" solutions that are effective for the industrial sector. Improved visibility of data and issues should enable better and quicker decision-making leading to operational efficiencies, higher production levels, improved safety, and cost savings.

A need exists for improved methods and systems for data collection in industrial environments, as well as for improved methods and systems for using collected data to provide improved monitoring, control, intelligent diagnosis of problems and intelligent optimization of operations in various heavy industrial environments such as refineries and their crude oil and product storage tanks.

DESCRIPTION OF RELATED ART INCLUDING INFORMATION DISCLOSED UNDER 37 CFR 1.97 AND 1.98

Not applicable.

BRIEF SUMMARY OF THE DISCLOSURE

In one embodiment, a method is taught for maintaining a fluid within a tank. In this method an upper data acquisition device is operated which is capable of obtaining at least one characteristic of the fluid in a tank adjacent to the upper data acquisition device. A lower data acquisition device is also operated which is situated below the upper data acquisition device, capable of obtaining at least one characteristic of the fluid in the tank adjacent to the lower data acquisition device. A data analyzer is then utilized which is capable of: receiving the characteristics of the fluid from the upper data acquisition device and the lower data acquisition device, comparing the characteristics from the upper data acquisition device and the lower data acquisition device, generating a data packet which contains the calculated operational speed and operational time needed for the intermittent mixer to agitate the fluid so that the at least one characteristic from the upper data acquisition device is within specifications of the at least one characteristic from the lower data acquisition device, and transmitting the data packet to the intermittent mixer. The method then automatically turns on the intermittent mixer from the data received from the data packet. Afterwards, the method automatically turns off the intermittent mixer from the data received from the data packet resulting in the at least one characteristic from the upper data acquisition device is within specifications of the at least one characteristic from the lower data acquisition device. In this method the intermittent mixer is capable of altering the fluid within the tank so that the at least one characteristic is consistent throughout the tank.

In an alternate embodiment, a method is taught for maintaining a hydrocarbon emulsion in a tank. In this method an upper data acquisition device is operated to obtain the density measurement of the hydrocarbon emulsion in a tank adjacent to the upper data acquisition device. A lower data acquisition device is situated below the upper data acquisition device and capable of obtaining the density measurement of the hydrocarbon emulsion in the tank adjacent to the lower data acquisition device. A data analyzer is then utilized which is capable of: receiving the density measurements of the hydrocarbon emulsion form the upper data acquisition device, receiving the density measurements of the hydrocarbon from the lower data acquisition device, comparing the density of the hydrocarbon emulsion form the upper data acquisition device and the lower data acquisition device, generating a data packet which contains a calculated operational speed and an operational time needed for the intermittent mixer to agitate the hydrocarbon emulsion so that the density measurements from the upper data acquisition device are within density specifications of the density measurements from the lower data acquisition device, and transmitting the data packet to the intermittent mixer. The intermittent mixer is then automatically turned on based of the information received from the data packet. The intermittent mixer is then automatically turned off based of the information received from the data packet. In this method, the intermittent mixer alters the density of the hydrocarbon emulsion within the tank, so it is consistent throughout the tank and wherein the intermittent mixer is only turned on when the density of the hydrocarbon emulsion from the upper data acquisition device are not within the specifications of the density of the hydrocarbon emulsion from the lower data acquisition device.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Figure 2:
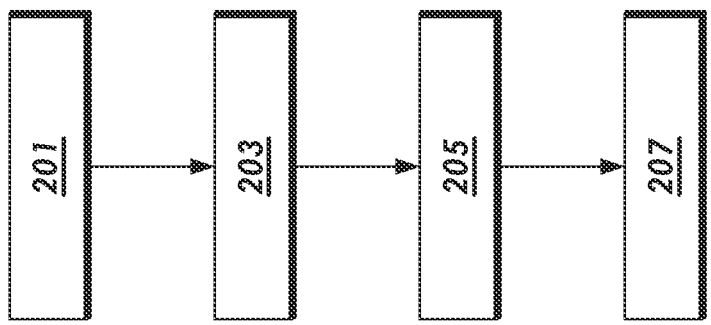
FIG. 2 depicts a flow diagram.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

In one embodiment, the present system describes a system wherein a first fluid is within a tank. An intermittent mixer is used for agitating the first fluid within the tank. At least one data acquisition device within the tank is capable of measuring at least one characteristic within the first fluid. In the embodiment, at least one data analyzer is capable of receiving the characteristics within the first fluid, comparing the characteristics within the first fluid to the characteristics of a second fluid, generating a data packet which contains a calculated operational speed and an operational time needed for the intermittent mixer to agitate the first fluid to obtain the characteristics of the second fluid and transmitting the data packet to the intermittent mixer. In this system the intermittent mixer is capable of altering the first fluid within the tank into the second fluid.

In yet another embodiment, the system described envisions a hydrocarbon emulsion with a tank. An intermittent mixer is used for agitating the hydrocarbon emulsion within the tank. An upper data acquisition device is capable of obtaining the density measurement of the hydrocarbon emulsion in the tank adjacent to the upper data acquisition device. A lower data acquisition device is situated below the upper data acquisition device capable of obtaining the density measurement of the hydrocarbon emulsion in the tank adjacent to the lower data acquisition device. In this embodiment, at least one data analyzer device is capable of: receiving the density measurements of the hydrocarbon emulsion from the upper data acquisition device, receiving the density measurements of the hydrocarbon emulsion from the lower data acquisition device, comparing the density of they hydrocarbon emulsion from the upper data acquisition device and the lower data acquisition device, generating a data packet which contains a calculated operational speed and an operational time needed for the intermittent mixer to agitate the hydrocarbon emulsion so that the density measurements from the upper data acquisition device are within density specifications of the density measurements from the lower data acquisition device, and transmitting the data packet to the intermittent mixer.

In one embodiment, a method is taught for maintaining a fluid within a tank. In this method an upper data acquisition device is operated which is capable of obtaining at least one characteristic of the fluid in a tank adjacent to the upper data acquisition device. A lower data acquisition device is also operated which is situated below the upper data acquisition device, capable of obtaining at least one characteristic of the fluid in the tank adjacent to the lower data acquisition device. A data analyzer is then utilized which is capable of: receiving the characteristics of the fluid from the upper data acquisition device and the lower data acquisition device, comparing the characteristics from the upper data acquisition device and the lower data acquisition device, generating a data packet which contains the calculated operational speed and operational time needed for the intermittent mixer to agitate the fluid so that the at least one characteristic from the upper data acquisition device is within specifications of the at least one characteristic from the lower data acquisition device, and transmitting the data packet to the intermittent mixer. The method then automatically turns on the intermittent mixer from the data received from the data packet. Afterwards, the method automatically turns off the intermittent mixer from the data received from the data packet resulting in the at least one characteristic from the upper data acquisition device is within specifications of the at least one characteristic from the lower data acquisition device. In this method the intermittent mixer is capable of altering the fluid within the tank so that the at least one characteristic is consistent throughout the tank.

In an alternate embodiment, a method is taught for maintaining a hydrocarbon emulsion in a tank. In this method an upper data acquisition device is operated to obtain the density measurement of the hydrocarbon emulsion in a tank adjacent to the upper data acquisition device. A lower data acquisition device is situated below the upper data acquisition device and capable of obtaining the density measurement of the hydrocarbon emulsion in the tank adjacent to the lower data acquisition device. A data analyzer is then utilized which is capable of: receiving the density measurements of the hydrocarbon emulsion form the upper data acquisition device, receiving the density measurements of the hydrocarbon from the lower data acquisition device, comparing the density of the hydrocarbon emulsion form the upper data acquisition device and the lower data acquisition device, generating a data packet which contains a calculated operational speed and an operational time needed for the intermittent mixer to agitate the hydrocarbon emulsion so that the density measurements from the upper data acquisition device are within density specifications of the density measurements from the lower data acquisition device, and transmitting the data packet to the intermittent mixer. The intermittent mixer is then automatically turned on based of the information received from the data packet. The intermittent mixer is then automatically turned off based of the information received from the data packet. In this method, the intermittent mixer alters the density of the hydrocarbon emulsion within the tank, so it is consistent throughout the tank and wherein the intermittent mixer is only turned on when the density of the hydrocarbon emulsion from the upper data acquisition device are not within the specifications of the density of the hydrocarbon emulsion from the lower data acquisition device.

In one embodiment, a method is taught where a fluid is first flowed into a tank, wherein the fluid is an unsettled hydrocarbon fluid. An initial height of the fluid is then calculated. An upper data acquisition device is then operated which is capable of obtaining at least one characteristic of the fluid in the tank adjacent to the upper data acquisition device. A lower data acquisition device is then operated, which is situated below the upper data acquisition device, which is capable of obtaining at least one characteristic of the fluid in the tank adjacent to the lower data acquisition device. A data analyzer is then utilized which is capable of: receiving the at least one characteristic of the fluid from the upper data acquisition device, receiving the at least one characteristic of the fluid from the lower data acquisition device, comparing the at least one characteristic of the fluid from the upper data acquisition device and the lower data acquisition device, generating a data packet which contains a calculated operational speed and an operational time needed for the intermittent mixer to agitate the fluid so that the at least one characteristic of the fluid from the upper data acquisition device are within specifications of the at least one characteristic of the fluid from the lower data acquisition device, and transmitting the data packet to the intermittent mixer. An intermittent mixer is automatically turned on from the information received from the data packet prior to the fluid settling. The intermittent mixer is then automatically turned off from the information received from the data packet resulting in the at least one characteristic from the upper data acquisition devise is within specifications of the at least one characteristic from the lower data acquisition device. A set volume of fluid is flowed from the tank, wherein the at least one characteristic of fluid extracted from the tank is consistent throughout the set volume of fluid. A secondary height of the fluid within the tank is calculated, wherein the volume of the fluid flowed from the tank is calculated from the initial height and the secondary height.

In yet an alternate embodiment, a method is taught where a fluid is first flowed into a tank, wherein the fluid is an unsettled hydrocarbon fluid. An initial height of the fluid is then calculated utilizing an upper data acquisition device. The upper data acquisition device is then operated which is capable of obtaining a density measurement of the fluid in the tank adjacent to the upper data acquisition device. A lower data acquisition device is then operated, which is situated below the upper data acquisition device, which is capable of obtaining a density measurement of the fluid in the tank adjacent to the lower data acquisition device. A data analyzer is then utilized which is capable of: receiving the density measurements of the fluid from the upper data acquisition device, receiving the density measurements of the fluid from the lower data acquisition device, comparing the density of the fluid from the upper data acquisition device and the lower data acquisition device, generating a data packet which contains a calculated operational speed and an operational time needed for the intermittent mixer to agitate the fluid so that the density measurements from the upper data acquisition device are within density specifications of the density measurements from the lower data acquisition device, and transmitting the data packet to the intermittent mixer. An intermittent mixer is automatically turned on from the information received from the data packet prior to the fluid settling. The intermittent mixer is then automatically turned off from the information received from the data packet resulting in the density measurement from the upper data acquisition devise is within specifications of the density measurement from the lower data acquisition device. A set volume of fluid is flowed from the tank, wherein the density of fluid extracted from the tank is consistent throughout the set volume of fluid. A secondary height of the fluid within the tank is calculated, wherein the volume of the fluid flowed from the tank is calculated from the initial height and the secondary height.

In one embodiment, the first fluid is a hydrocarbon product. Examples of the first fluid can be gasoline, diesel fuel, heating oil, jet fuel, petrochemical feedstocks, waxes, lubricating oils, asphalt, and combinations thereof. In other examples the fluid can be an emulsion and or a slurry. Likewise in one embodiment, the fluid can be a hydrocarbon product or a hydrocarbon emulsion. Examples of the fluid gasoline, diesel fuel, heating oil, jet fuel, petrochemical feedstocks, waxes, lubricating oils, asphalt, and combinations thereof. In some embodiments, the hydrocarbon emulsion is a combination of non-polar hydrocarbons typically found in a refinery process and polar substances such as water or wastewater.

In some embodiments, the tank is any variety of crude and/or product storage tanks that are typically found in a refinery or a terminal. The product of the tanks are typically held to be processed, held to be blended, or held to be shipped to market.

The mixer of these embodiments can be any number of mixers within the tank and can be placed in any conventionally known configurations. The configurations of the mixer can be differentiated based on number of mixers, which can vary from one to seven or even thirty, and the swivel angle of the mixer which can vary about the mixer's axis of rotation. The swivel angles of mixers in tanks are changed based on the desired results.

In one embodiment, the mixers are capable of being turned on and off. Historically, mixers are constantly left on in the tanks in refineries or terminals. This accounts for significant energy, specifically electrical usage at a refinery. It is theorized by turning the mixer on and off significant electrical use at the refinery can be reduced. By utilizing the combination of at least one data acquisition device and at least one data analyzer it would ensure that the fluid within the tank will maintain the properties of a consistent hydrocarbon emulsion throughout the tank. This consistent hydrocarbon emulsion will also ensure that during hydrocarbon custody transfers at a tank, the process of performing a custody transfer will be faster since operators would not have to wait for the hydrocarbon emulsion to settle or constantly turn on the mixers. Furthermore, by taking consistent measurements of the properties within the tank, such as density, as soon as the density measurements is consistent throughout the tank the custody transfer can begin. Also it is envisioned that the at least one data acquisition device can be used to additionally measure the height of fluid within a tank, since one would know the height a data acquisition device was placed.

In one embodiment, it is envisioned that the at least one data acquisition device is able to detect a chemical characteristic of the fluid. Alternatively, it is envisioned that the at least one data acquisition device is able to detect a physical characteristic of the fluid. In other embodiments, it is envisioned that the at least one data acquisition device is able to detect multiple characteristics of the fluid simultaneously. Examples of characteristics of the fluid that the at least one data acquisition device is able to measure include those such as density, specific gravity, temperature, specific volume, viscosity, molecular weight, flash temperature, octane numbers, research octane numbers, motor octane numbers, antiknock index, boiling point, molecular type compositions, elemental analysis, freezing point, carbon residue, pour point, cloud point, vapor pressure, reid vapor pressure, flammability range, wax and asphaltene contents, cetane number, aniline point, carbon-to-hydrogen ratios, additive ratios, and combinations thereof.

It is also envisioned in the embodiment, that the characteristics measured by the at least one data acquisition device can be continuously measured. It is also envisioned that it is possible that the at least one data acquisition device is an approved American Petroleum Institute custody transfer metering device. Also, it is envisioned that it is possible that the at least one data analyzer is an approved American Petroleum Institute custody transfer metering device. Lastly, it is envisioned that the methods and systems taught by this invention are an approved American Petroleum Institute custody transfer metering system and method.

While this novel method and system can operate with just one data acquisition device the operability of the method and system can operate with multiple data acquisition devices. For example in one embodiment, the tank can situate one data acquisition device at the bottom of the tank and another data acquisition device at the top of the tank to obtain a full analysis of the tank. In another example, the tank can situate one data acquisition device at the bottom of the tank, one data acquisition device in the middle of the tank, and one data acquisition device at the top of the tank to obtain a full analysis of the tank. In yet another example, the tank can situate one data acquisition device at the bottom of the tank, one data acquisition device a quarter of the way up the tank, one data acquisition device halfway up the tank, one data acquisition device three quarters of the way up the tank, and one data acquisition device at the top of the tank to obtain a full analysis of the tank. In yet another example, the tank can situate one data acquisition device at the bottom of the tank and repeat the placement of data acquisition devices in five meter increments all the way up the tank. In yet another example, the tank can situate one data acquisition device at the bottom of the tank and repeat the placement of data acquisition devices in one meter increments all the way up the tank. In yet another example, the tank can situate any multitude of data acquisition devices from the bottom of the tank up to the top of the tank.

In one embodiment, since there is the possibility of a multitude of data acquisition devices within the system, it is envisioned that this method can skip data acquisition devices that provide malfunctioning data to the data analyzer. For example in a situation where there are ten data acquisition devices within the system and the second device from the bottom indicates that it is the upper height of the tank since it is not recognizing the characteristic of the fluid in the tank which is adjacent to the second device, while the third, fourth, and first data acquisition device indicates that there is fluid in the tank then the data from the second device will be skipped by the data analyzer. In yet another example, if there are two or more parallel columns of data acquisition devices in the tank, and a pair of data acquisition devices within the tank do not provide characteristics of the fluid that are within a certain range of each other, then the data for those data acquisition devices will be excluded.

Terms such as certain range of each other or characteristics of a data acquisition device that is within specification of another data acquisition device can be any range required by the tank operator. In some examples, the ranges can be within 0.5% of each other or 1%, 2%, 3%, 4%, 5%, 6%, 7%, 8%, 9%, or even 10% of each other. Alternatively, they can be within 15%, 20%, 25%, 30%, 45%, or even 50% of each other.

As described above when the characteristic of the fluid is within the characteristic of the desired fluid, or within the characteristic of another data acquisition device, or within the characteristic of the other data acquisition devices, the intermittent mixer or mixers can be turned off. Likewise, when the characteristic of the fluid is not within the characteristic of the desired fluid, or not within the characteristic of another data acquisition device, or not within the characteristic of the other data acquisition devices, the intermittent mixer or mixers can be turned on.

Specifically, in the situation regarding custody transfer of fluids, historically, fluids are flowed into a tank and either the tank fluids were allowed to settle, or a tank mixer was turned on. In the situation where the tank fluids were allowed to settle, different layers within the tank would form and the tank operator would have to manually determine the stratification of the layers and flow from the tank different fluids till their desired fluid exited the tank. Alternatively, a tank mixer was continuously turned on and the operator would have to manually test the fluid within the tank at different volumes to ensure the fluids were sufficiently settled and/or emulsified. This current method allows for automatic detection of when the fluids within the tank are consistent throughout so that the downstream purchaser of the fluid can accurately obtain a set volume of fluids with knowledge that the fluids are consistent throughout. There is significant cost savings through this approach since the tank mixer does not need to be continuously turned on. Additionally, there is significant time savings with this approach since operators do not have to wait for the tank to settle.

The following examples of certain embodiments of the invention are given. Each example is provided by way of explanation of the invention, one of many embodiments of the invention, and the following examples should not be read to limit, or define, the scope of the invention.

EXAMPLE 1

Figure 1:
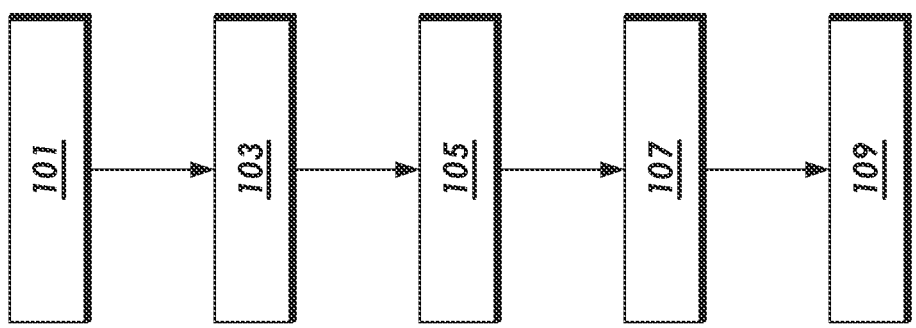
FIG. 1 depicts a flow diagram.

FIG. 1 is a flow diagram outlining a method of:
101—operating an upper data acquisition device capable of obtaining at least one characteristic of the fluid in a tank adjacent to the upper data acquisition device.
103—operating a lower data acquisition device, situated below the upper data acquisition device, capable of obtaining at least one characteristic of the fluid in the tank adjacent to the lower data acquisition device.
105—utilizing a data analyzer.
107—automatically turning on the intermittent mixer from the data received from the data packet.
109—automatically turning off the intermittent mixer from the data received from the data packet resulting in the at least one characteristic from the upper data acquisition device is within specifications of the at least one characteristic from the lower data acquisition device.

This method can be repeated as many times as necessary.

EXAMPLE 2

FIG. 2 is a flow diagram outlining a method of utilizing a data analyzer:
201—receiving the characteristics of the fluid from an upper data acquisition device and a lower data acquisition device.
203—comparing the characteristics from the upper data acquisition device and the lower data acquisition device.
205—generating a data packet which contains the calculated operational speed and operational time needed for the intermittent mixer to agitate the fluid so that the at least one characteristic from the upper data acquisition device is within specifications of the at least one characteristic from the lower data acquisition device.
207—transmitting the data packet to the intermittent mixer.

EXAMPLE 3

Figure 3:
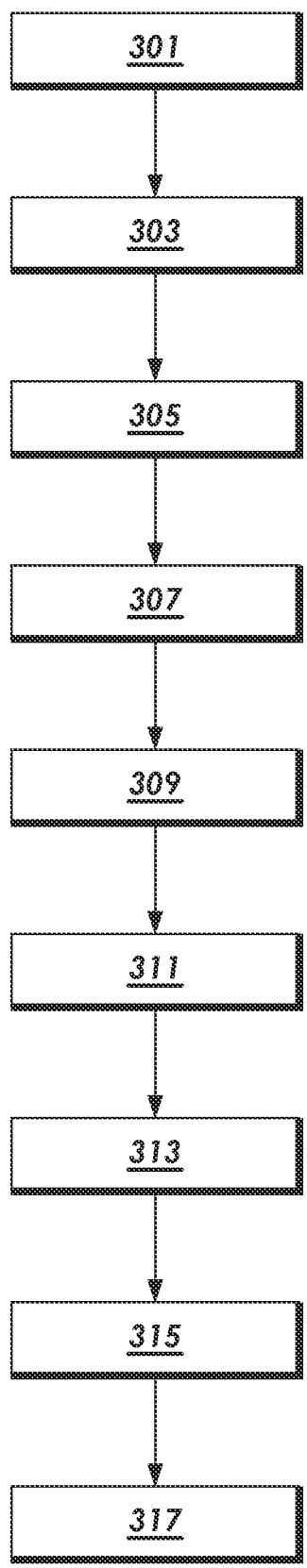
FIG. 3 depicts a flow diagram.

FIG. 3 is a flow diagram outlining a method of flowing a set volume of fluid from a tank wherein the characteristic of the fluid is consistent throughout the set volume of fluid.

301—flowing a fluid into a tank, wherein the fluid is an unsettled hydrocarbon fluid.

303—calculating an initial height of a fluid within a tank.

305—operating an upper data acquisition device capable of obtaining at least one characteristic of the fluid in the tank adjacent to the upper data acquisition device.

307—operating a lower data acquisition device, situated below the upper data acquisition device, capable of obtaining at least one characteristic of the fluid in the tank adjacent to the lower data acquisition device.

309—utilizing a data analyzer capable.

311—automatically turning on the intermittent mixer from the information received from the data packet prior to fluid settling.

313—automatically turning off the intermittent mixer from the information received from the data packet resulting in the at least one characteristic from the upper data acquisition device is within specifications of the at least one characteristic from the lower data acquisition device.

315—flowing a set volume of fluid from the tank, wherein the at least one characteristic of fluid extracted from the tank is consistent throughout the set volume of fluid.

317—calculating a secondary height of the fluid within the tank, wherein the volume of fluid flowed from the tank is calculated from the initial height and the secondary height.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method of maintaining a fluid comprising:
   operating an upper data acquisition device to obtain at least one characteristic of the fluid in a tank adjacent to the upper data acquisition device, wherein the at least one characteristic of the fluid in the tank adjacent to the upper data acquisition device is selected from the group consisting of at least one physical characteristic and at least one chemical characteristic;
   operating a lower data acquisition device that is situated below the upper data acquisition device to measure the at least one characteristic of the fluid in the tank adjacent to the lower data acquisition device;
   utilizing a data analyzer to:
      receive the at least one characteristic of the fluid from the upper data acquisition device and the lower data acquisition device;
      compare the at least one characteristic from the upper data acquisition device and the lower data acquisition device to generate a data packet that contains a calculated mixer operational speed and a calculated mixer operational time that is needed for an intermittent mixer to agitate the fluid so that the at least one characteristic measured by the upper data acquisition device is consistent with the at least one characteristic measured by the lower data acquisition device;
      transmit the data packet to the intermittent mixer to turn on the intermittent mixer at the calculated operational speed and for the calculated operational time, wherein the intermittent mixer turns off when the data received from the data packet indicates that the at least one characteristic measured by the upper data acquisition device is consistent with the at least one characteristic measured by the lower data acquisition device,
      wherein consistent is in a range from 0.5% to 50% difference between the measurement by the upper data acquisition device and the measurement by lower data acquisition device,
      wherein the intermittent mixer mixes the fluid within the tank so that the at least one characteristic is consistent throughout the tank.

2. The method of claim 1, wherein the fluid is a hydrocarbon product.

3. The method of claim 2, wherein the fluid is selected from the group consisting of: gasoline, diesel fuel, heating oil, jet fuel, petrochemical feedstocks, waxes, lubricating oils, asphalt, and combinations thereof.

4. The method of claim 1, wherein the at least one characteristic is selected from the group consisting of: density, specific gravity, temperature, specific volume, viscosity, molecular weight, flash temperature, octane numbers, research octane numbers, motor octane numbers, antiknock index, boiling point, molecular type compositions, elemental analysis, freezing point, carbon residue, pour point, cloud point, vapor pressure, Reid vapor pressure, flammability range, wax and asphaltene contents, cetane number, aniline point, carbon-to-hydrogen ratios, additive ratios, and combinations thereof.

5. The method of claim 1, wherein the upper data acquisition device continuously measures the at least one characteristic within the fluid.

6. The method of claim 1, wherein the fluid is an emulsion.

7. The method of claim 1, wherein the fluid is a slurry.

8. The method of claim 1, wherein the data analyzer is an American Petroleum Institute (API) approved custody transfer metering device.

9. The method of claim 1, wherein the intermittent mixer is turned off when the data analyzer determines that the at least one characteristic measured by the upper data acquisition device is not consistent with the at least one characteristic measured by the lower data acquisition device.

10. The method of claim 1, wherein the intermittent mixer is turned on only when the data analyzer determines that the at least one characteristic from the upper data acquisition device is not consistent with the at least one characteristic from the lower data acquisition device.

11. A method of maintaining a hydrocarbon emulsion comprising:
   operating an upper data acquisition device to obtain a density measurement of the hydrocarbon emulsion in a tank adjacent to the upper data acquisition device,
   operating a lower data acquisition device that is situated below the upper data acquisition device to measure the density measurement of the hydrocarbon emulsion in the tank adjacent to the lower data acquisition device;
   utilizing a data analyzer to:

receive the density measurement of the hydrocarbon emulsion from the upper data acquisition device and the lower data acquisition device;

compare the density measurement of the hydrocarbon emulsion from the upper data acquisition device and the lower data acquisition device to generate a data packet that contains a calculated mixer operational speed and a calculated mixer operational time that is needed for an intermittent mixer to agitate the fluid so that the density measurement from the upper data acquisition device is consistent with the density measurement from the lower data acquisition device;

transmit the data packet to the intermittent mixer to turn on the intermittent mixer at the calculated operational speed and for the calculated operational time, wherein the intermittent mixer turns off when the data received from the data packet indicates that the density of the hydrocarbon emulsion measured by the upper data acquisition device is consistent with the density of the hydrocarbon emulsion measured by the lower data acquisition device, wherein consistent is in a range from 0.5% to 50% difference between the density measurement by the upper data acquisition device and the density measurement by lower data acquisition device.

* * * * *